United States Patent
Noro et al.

[11] Patent Number: 5,929,586
[45] Date of Patent: Jul. 27, 1999

[54] VEHICULAR MOTOR DRIVING APPARATUS

[75] Inventors: Yoshiki Noro; Yoshinobu Mukai; Masaaki Kawano, all of Wako, Japan

[73] Assignee: Honda Giken Kogyo Kabushika Kaisha, Tokyo, Japan

[21] Appl. No.: 09/123,662

[22] Filed: Jul. 28, 1998

[30] Foreign Application Priority Data

Jan. 18, 1997 [JP] Japan .................................... 9-208139

[51] Int. Cl.$^6$ .................................................. G05B 11/28
[52] U.S. Cl. ............................ 318/599; 363/8; 363/127; 318/581; 318/807; 318/811; 388/814
[58] Field of Search ..................................... 318/599, 581, 318/807, 811; 363/8, 127; 388/814

[56] References Cited

U.S. PATENT DOCUMENTS

5,321,596  6/1994  Hurst .................................. 318/599 X
5,501,201  3/1996  Miyoshi et al. .................... 318/599 X

*Primary Examiner*—Karen Masih
*Attorney, Agent, or Firm*—Merchant, Gould, Smith, Edell, Welter & Schmidt, P.A.

[57] ABSTRACT

A vehicular motor driving apparatus includes a control unit 15 for drive-controlling a motor by PWM-drive-controlling a motor driving circuit based on a motor starting signal. The control unit has a drive controller for setting a drive frequency of a PWM-drive control signal to be an integral multiple of or (integer+0.5) times a channel frequency interval of channel frequencies allotted for AM radio broadcasts. As a result, radiation noise associated with harmonics of the PWM-drive control signal, when coincided with the channel frequencies used by AM radio broadcast stations, is removed along with the channel frequencies through radio receiver detection. When the radiation noise does not coincide with the in-use channel frequencies, it is offset by the channel frequency interval therefrom, thereby preventing its reception.

4 Claims, 6 Drawing Sheets

VEHICULAR MOTOR DRIVING APPARATUS

BACKGROUND OF THE INVENTION

1. Field of the Invention

This invention relates generally to a vehicular motor driving apparatus for driving a vehicle-mounted electric motor and, more particularly, to a vehicular motor driving apparatus in which arrangements are made to prevent a PWM (pulse-width modulation) signal for driving the electric motor from being generated in an AM radio as noise.

2. Description of the Related Art

Conventional vehicular motor driving apparatuses include a vehicle-mounted electric power steering apparatus, a rear wheel steering apparatus for four-wheel steering, an automatic steering apparatus and a power window apparatus. Electric motors of these apparatuses are driven by a given voltage from a battery. In certain conditions, they are PWM-driven to vary a current passing through the motors.

PWM-drive frequencies are preferably set in a range of, for example, 16 kHz to 30 kHz to prevent PWM-drive signals from becoming audible to a driver and to keep the PWM-drive switching loss to a minimum.

Certain conventional vehicular motor driving apparatuses have a PWM-drive frequency fixed, for example, at 17 kHz, and include harmonic components (harmonics) which are an integral multiple of the fundamental frequency (17 kHz) since the PWM-drive has a pulse waveform. When they are positioned closely to a channel frequency of a radio, the harmonics may be received as AM (amplitude modulation) signals by a car radio and be heard as noises.

Assume, for example, that while driving, a driver is listening to a radio broadcast tuned in a channel frequency of 594 KHz. When a PWM-drive frequency is set to be 17 kHz, harmonic components of thirty five (35) times the PWM-drive frequency (17 kHz×35=595 kHz) are present closely to the channel frequency of 594 kHz, whereby the deviation (absolute value: 1 kHz) between the channel frequency of 594 kHz and the frequency of 595 kHz of the harmonics arises as an audio signal and can be heard as noise over a radio.

Similarly, when the driver is listening to a radio broadcast of different channel frequency, the harmonic components of a PWM-drive frequency may be heard as noise over the radio as the harmonic components are present closely to the channel frequency.

In order to avoid the phenomenon in which the harmonic components of a PWM-drive frequency are received by a radio and become noises, attempts have been made to delay the rise time and decay time of the pulse waveform of the PWM-drive signal to thereby attenuate the harmonic components. However, delaying of the rise and decay times of the pulse waveform results in an increased switching loss in a motor drive circuit (e.g., a bridge circuit formed of an FET employed as a switching element), whereby the FET produces heat and countermeasures to the heat generation are required. As the countermeasures, one may think of using heat radiation fins, decreasing the ON resistance of FET elements and parallel connecting FETs. However, these countermeasures require the work of careful choosing of parts and increase the number of required parts, thereby increasing the costs of the resulting products.

Consequently, provision is demanded of a vehicular motor driving apparatus which is arranged to prevent the radiation noise associated with the harmonic components of a PWM-drive frequency from being received by a radio receiver, requires a minimum cost of manufacture, and has a high S/N ratio.

SUMMARY OF THE INVENTION

According to one aspect of the present invention, there is provided a vehicular motor driving apparatus for driving an electric motor mounted on a vehicle carrying a radio receiver, which comprises a motor driving circuit for driving the motor, and a control unit having a drive controller which, for generating a PWM-drive control signal for controlling the PWM-drive of the motor driving circuit on the basis of a motor starting signal, sets a drive frequency of the PWM-drive control signal to be an integral multiple of a channel frequency interval of channel frequencies allotted for AM radio broadcasts.

The drive controller frequency-divides a reference clock generated by a crystal resonator to set the drive frequency of the PWM-drive control signal to be an integral multiple of the channel frequency interval.

Since the control unit has the drive controller for setting the drive frequency of the PWM-drive control signal and radiation noise associated with harmonic components of the PWM-drive control signal to be an integral multiple of the channel frequency interval of the channel frequencies allotted for AM radio broadcasts, the radiation noise, when coincided with the channel frequencies used by AM radio broadcast stations, is removed along with the channel frequencies through the detection of a radio receiver. Consequently, it becomes possible to prevent the radiation noise associated with the harmonics of the PWM-drive control signal from being received by an AM radio.

Further, even when the radiation noise does not coincide with the channel frequencies used by AM radio broadcast stations, it coincides with the channel frequencies allotted for AM radio broadcasts but not in use. Thus, it becomes possible to cause the radiation noise associated with the harmonic components of the PWM-drive control signal to be offset by the channel frequency interval from the channel frequencies used by the AM radio broadcast stations, thereby preventing the reception of the radiation noise.

According to another aspect of the present invention, there is provided a vehicular motor driving apparatus for driving an electric motor mounted on a vehicle carrying a radio receiver, which comprises a motor driving circuit for driving the motor, and a control unit having a drive controller which, for generating a PWM-drive control signal for controlling the PWM-drive of the motor driving circuit on the basis of a motor starting signal, sets a drive frequency of the PWM-drive control signal to be (integer+0.5) times a channel frequency interval of channel frequencies allotted for AM radio broadcasts The drive controller frequency-divides a reference clock generated by a crystal resonator to set the drive frequency of the PWM-drive control signal to be (integer+0.5) times the channel frequency interval.

Since the control unit has the drive controller for setting the drive frequency of the PWM-drive control signal and radiation noise associated with harmonic components of the PWM-drive control signal to be (integer+0.5) times the channel frequency interval of the channel frequencies allotted for AM radio broadcasts, it becomes possible to cause the radiation noise to coincide with the channel frequencies assigned for AM radio broadcasts or with an intermediate value of the channel frequency interval, thus keeping the radiation noise away from the in-use channel frequencies and preventing its reception.

BRIEF DESCRIPTION OF THE DRAWINGS

Preferred embodiments of the present invention will hereinafter be described in detail, by way of example only, with reference to the accompanying drawings, in which.

DETAILED DESCRIPTION OF THE PREFERRED EMBODIMENT

The following description is merely exemplary in nature and is in no way intended to limit the invention or its application or uses.

In one aspect, this invention provides an arrangement for making the radiation noise of the harmonic components of a PWM-drive signal for driving an electric motor coincide with a channel frequency of an actual AM radio station or with an allotted channel frequency, thereby avoiding the bad effects of the radiation noise produced when receiving an AM radio broadcast.

The present invention, in another aspect, provides an arrangement for making the radiation noise of the harmonic components of a PWM-drive signal for driving the motor coincide with a channel frequency allotted to an AM radio station or conform to an intermediate value of a channel frequency interval, thereby preventing the radiation noise from being received over an AM radio.

Figure 1:
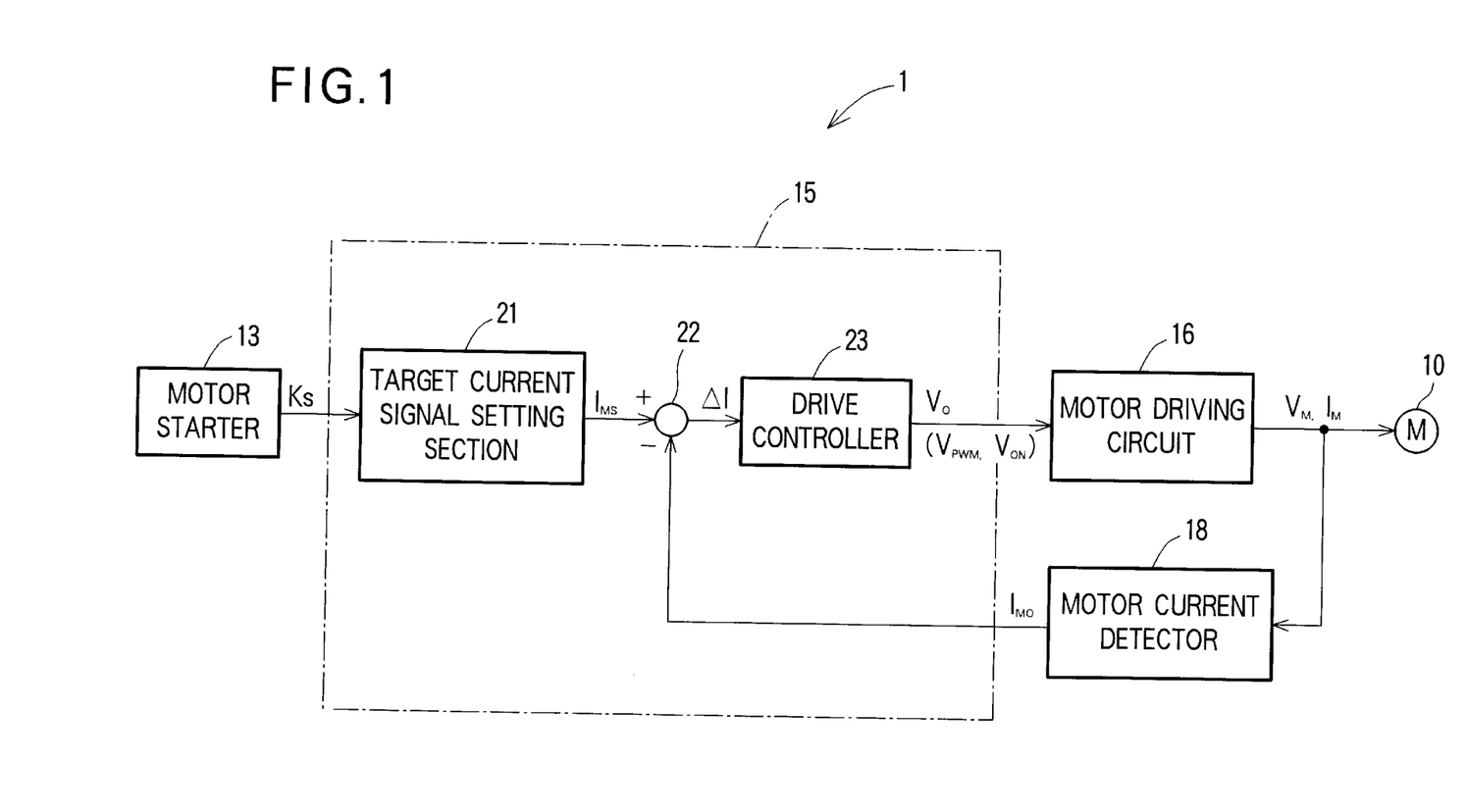
FIG. 1 is a block diagram illustrating the overall arrangement of a vehicular motor driving apparatus according to the present invention.

Referring to FIG. 1, a vehicular motor driving apparatus 1 comprises a motor starter 13, a control unit 15, a motor driving circuit 16 and a motor current detector 18.

Control unit 15 performs various calculations and processing and thus includes a microprocessor and a memory, though not shown. It also has a target current signal setting section 21, a deviation calculating section 22 and a drive controller 23.

Target current signal setting section 21 comprises a memory such as a ROM. The memory stores target current signal data corresponding to motor starting signal data (signal) $K_S$ established on the basis of values from advance experiments or designed values. When the target current signal setting section 21 is fed with a motor starting signal $K_S$ from a motor starter 13, it reads out corresponding target current signal data from the memory and supplies a target current signal $I_{MS}$ to the deviation calculating section 22.

Deviation calculating section 22 has a subtraction function and calculates a deviation (=$I_{MS}-I_{MO}$) between the target current signal $I_{MS}$ fed from the target current signal setting section 21 and a motor current signal $I_{MO}$ corresponding to a motor current $I_M$ detected by a motor current detector 18. The calculated deviation is fed as a deviation signal $\Delta I$ to the drive controller 23.

Drive controller 23 comprises a PID controller and a control signal generator, which will be explained in greater detail below. The drive controller performs proportional (P), integral (I) and differential (D) calculations with respect to the deviation signal $\Delta I$ fed from the deviation calculating section 22, and feeds a motor control signal $V_O$, comprised of an ON signal $V_{ON}$ and a PWM-drive control signal $V_{PWM}$ having a predetermined duty ratio, to a motor driving circuit 16.

Further, the drive controller 23 has an N times frequency setting section or an (N+0.5) times frequency setting section and sets a drive frequency of the PWM-drive control signal $V_{PWM}$ based on a reference clock for determining the action of the entire control unit 15 or on a high precision clock determined by an exclusive high precision crystal resonator.

Motor driving circuit 16 comprises a bridge circuit composed of switching elements such as four power FETs (field-effect transistors) or four IGBTs (insulated-gate bipolar transistors). Based on the motor control signal $V_O$, the motor driving circuit 16 PWM-drives and ON-drives respective pairs of switching elements positioned diagonally in the bridge circuit and outputs motor voltage $V_M$ (motor current is $I_M$) to drive a motor 10.

Motor current detector 18 detects the motor current $I_M$ actually flowing through the motor 10 and feeds the motor current signal $I_{MO}$ corresponding to the motor current $I_M$ back to the control unit 15.

As shown in FIG. 1, the deviation calculating section 22, drive controller 23, motor driving circuit 16 and motor current detector 18 jointly form a negative feedback (NFB) loop.

Figure 2:
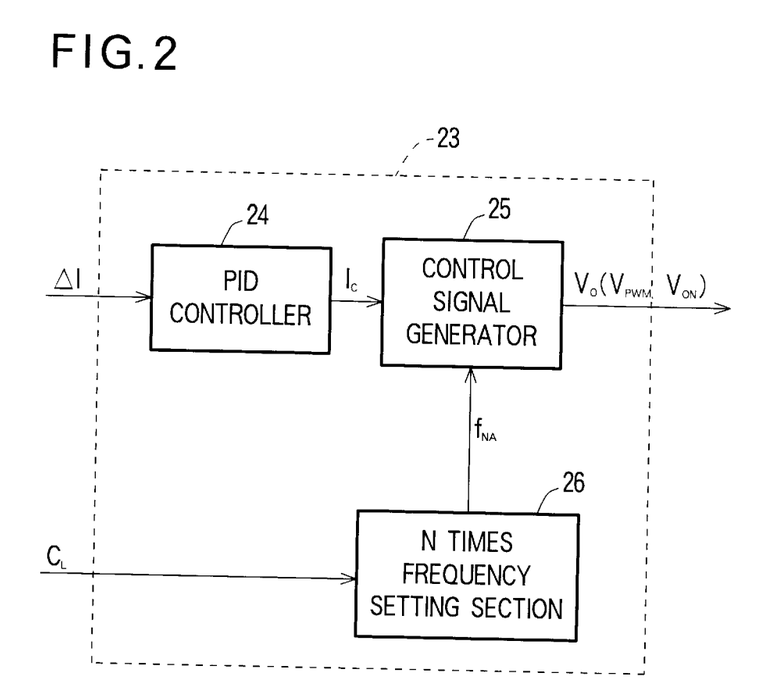
FIG. 2 is a block diagram showing a drive controller of the motor driving apparatus, in accordance with a first embodiment of the present invention.

Reference is now made to FIG. 2 showing in block diagram the drive controller 23 according to a first embodiment.

As shown in FIG. 2, the drive controller 23 comprises a PID controller 24, a control signal generator 25 and an N times frequency setting section 26.

PID controller 24 has proportional (P), integral (I) and differential (D) calculation functions and imparts a proportional control, an integral control and a differential control to the deviation signal $\Delta I$. Thereafter it supplies the resulting composite signal $I_C$ to the control signal generator 25.

Control signal generator 25 has an ON signal generator and a PWM-drive control signal generator. Based on the composite signal $I_C$ fed from the PID controller 24, the control signal generator 25 feeds a motor control signal $V_O$, composed of an ON signal $V_{ON}$ and a PWM-drive control signal $V_{PWM}$ having a predetermined duty ratio, to the motor driving circuit 16 (see FIG. 1).

In addition, the control signal generator 25 determines a drive frequency of the PWM-drive control signal $V_{PWM}$ which conforms to a frequency signal $f_{NA}$ fed from an N times frequency setting section 26.

N times frequency setting section 26 has a frequency dividing circuit such as a programmable counter and hence a frequency dividing function. The N times frequency setting section 26 performs frequency-division (frequency division value K) so that a microprocessor reference clock $C_L$ for controlling the action of the entire control unit 15 (see FIG. 1) becomes an integral multiple N of a channel frequency interval $\Delta f$ between channel frequencies allotted as AM radio broadcast stations, and generates a driving frequency $f_{NA}$ for feeding to the control signal generator 25, which drive frequency is an integral multiple N of the channel frequency interval $\Delta f$ and represented by Exp. (1):

$$f_{NA} = f \times N = C_L/K \qquad (1)$$

The integral multiple N of the channel frequency interval $\Delta f$ may be set in a range of 16 kHz to 30 kHz so as to meet the requirements to keep a switching loss in the PWM-drive to a minimum and make the drive frequency $f_{NA}$ unhearable to a driver.

The conditions in which application of the present invention are allowed may be represented by Exp. (2):

$$f_{KN} = n \times \Delta f \qquad (2)$$

where $f_{KN}$ is a channel frequency allotted as an AM radio broadcast station; $\Delta f$ is a channel frequency interval between the channel frequencies $f_{KN}$; and n is an integer.

Discussion will next be made as to the setting of the frequency division value K, appearing in Exp. (1), for the N times frequency setting section 26, as well as to the setting of the drive frequency $f_{NA}$ for the PWM-drive control signal $V_{PWM}$, with reference to Japanese AM radio broadcasts as an example.

In Japan, channel frequencies $f_{KN}$ are allotted for AM radio broadcasts at an interval of 9 kHz (channel frequency interval $\Delta f = 9$ kHz). In Tokyo area, a channel frequency of 594 kHz is allotted to NHK Radio #1, 693 kHz to NHK Radio #2, 954 kHz to TBS Radio, 1134 kHz to Bunka and 1242 kHz to Nippon. All these channel frequencies $f_{KN}$ allotted to the named AM radio broadcast stations are an integral multiple of the channel frequency interval $\Delta f$ (=9 kHz). That is, 594 kHz of NHK Radio #1, 693 kHz of NHK Radio #2, 954 kHz of TBS Radio, 1134 kHz of Bunka Broadcast and 1242 kHz of Nippon Broadcast are respectively 66 times, 77 times, 106 times, 126 times and 138 times the channel frequency interval $\Delta f$ (=9 kHz).

Because the drive frequency $f_{NA}$ of the PWM-drive control signal $V_{PWM}$ generated in the N times frequency setting section 26 is desired to be in a range of 16 kHz to 30 kHz, when the channel frequency interval $\Delta f$ is set to be 9 kHz, values of the integral multiple N obtainable from Exp. (1) above are 2 times (N=2) or three times (N=3). When integer N=2, the drive frequency $f_{NA}$ is set to be 18 kHz (=9 kHz×2). Similarly, when integer N=3, the drive frequency $f_{NA}$ is set to be 27 kHz (=9 kHz×3).

Accordingly, the N times frequency setting section 26, when setting the drive frequency $f_{NA}$ to be 18 kHz, settles on frequency division value K=$C_L$/18 kHz while it settles on frequency division value K=$C_L$/27 kHz when setting the drive frequency $f_{NA}$.

Figure 5A:
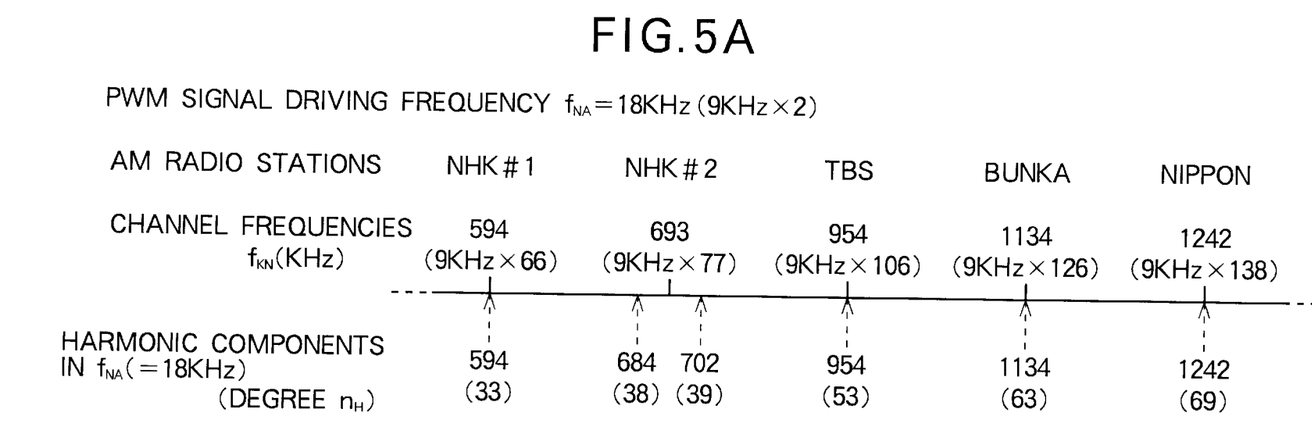
FIG. 5A and FIG. 5B illustrate a relation between a channel frequency ($f_{KN}$) and a drive frequency ($f_{NA}$) where the drive frequency ($f_{NA}$) of a PWM signal shown in the first embodiment is set to be an integral multiple of a channel frequency interval $\Delta f$ (=9 kHz)
Figure 5B:
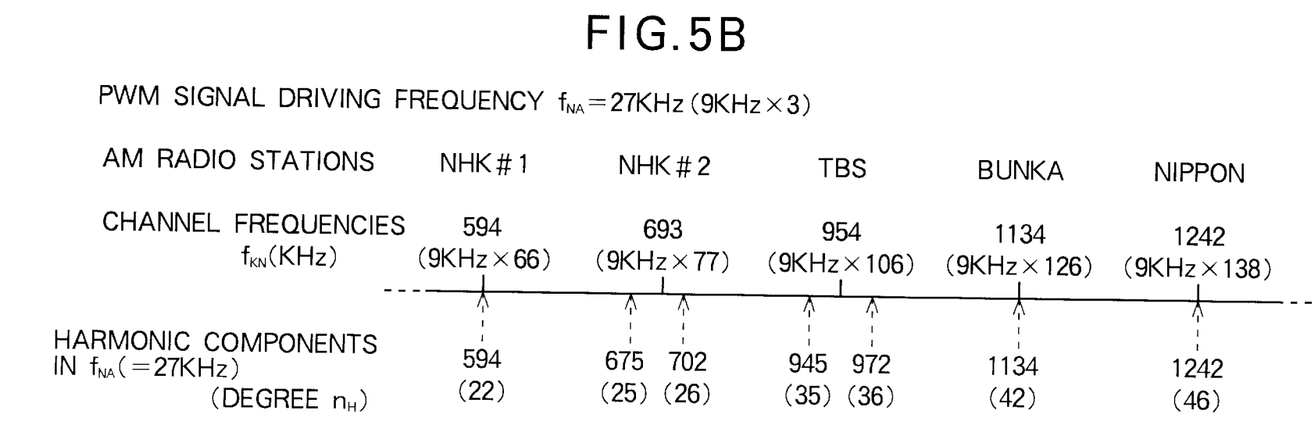

Reference is next made to FIG. 5A and FIG. 5B which illustrate a relation between the channel frequency $f_{KN}$ and the drive frequency $f_{NA}$ where the drive frequency $f_{NA}$ of the PWM signal is set to be an integral multiple of the channel frequency interval $\Delta f$ (=9 kHz). More specifically, FIG. 5A shows such a relation where the drive frequency $f_{NA}$ is set to be two times the channel frequency interval $\Delta f$ ($f_{NA}$=18 kHz) while FIG. 5B shows such a relation where the drive frequency $f_{NA}$ is set to be three times the channel frequency interval $\Delta f$ ($f_{NA}$=27 kHz).

As can be appreciated from FIG. 5A, the harmonics of the drive frequency ($f_{NA}$=18 kHz) coincide with the channel frequencies $f_{KN}$ of NHK #1, TBS Radio, Bunka and Nippon, except for NHK #2 (channel frequency $f_{KN}$=693 kHz).

From NHK #2 (channel frequency $f_{KN}$=693 kHz), the harmonics (degrees: 38, 39) of the drive frequency ($f_{NA}$=18 kHz) are offset by the channel frequency interval $\Delta f$ (=9 kHz) but coincide with the channel frequencies $f_{KN}$ assigned for AM radio broadcasts but not yet in use.

In FIG. 5B, the harmonics of the drive frequency ($f_{NA}$=27 kHz) coincide with the channel frequencies of NHK #1, Bunka and Nippon, but for NHK #2 (channel frequency $f_{KN}$=693 kHz) and TBS (channel frequency $f_{KN}$=954 kHz).

From NHK #2 (channel frequency $f_{KN}$=693 kHz) and TBS (channel frequency $f_{KN}$=954 kHz), the harmonics of the drive frequency ($f_{NA}$=27 kHz) are offset by at least one channel frequency interval $\Delta f$ (=9 kHz) but coincide with the channel frequencies $f_{KN}$ assigned for AM radio broadcasts but not yet in use.

Having the described drive controller 23 for setting the drive frequency $f_{NA}$ of the PWM-drive control signal $V_{PWM}$ to be an integral multiple of the channel frequency interval $\Delta f$ between the channel frequencies $f_{KN}$ allotted as AM radio broadcast stations, the control unit 15 shown in FIG. 1 can remove, through the detection by a radio receiver, the radiation noise along with the channel frequency by causing the radiation noise of the harmonics of the PWM-drive control signal $V_{PWM}$ to be generated in the form of an integral multiple of the channel frequency interval $\Delta f$ (9 kHz) of the AM radio broadcast stations when the radiation noise coincides with the channel frequencies of the actual AM radio broadcast stations.

In addition, when the radiation noise does not coincide with the channel frequencies used by the radio broadcast stations, it is offset by the channel frequency interval $\Delta f$ so that it coincides with the channel frequencies assigned for AM radio broadcasts but not in use, whereby it is prevented from being received.

Figure 3:
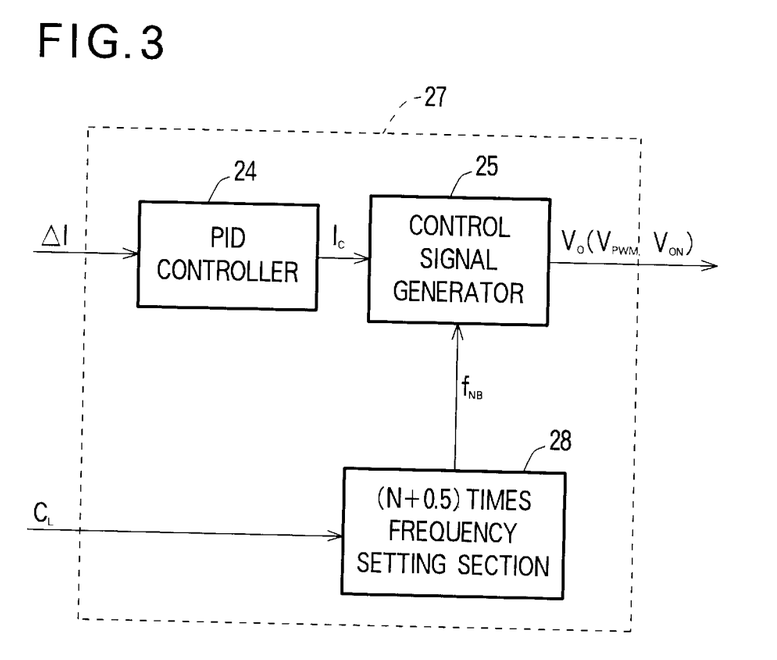
FIG. 3 is a block diagram showing a drive controller of the motor driving apparatus, in accordance with a second embodiment of the present invention.

Reference is next made to FIG. 3 which illustrates, in block diagram, a drive controller 27 according to a second embodiment.

As shown in FIG. 3, the drive controller 27 comprises a PID controller 24, a control signal generator 25 and an (N+0.5) times frequency setting section 28. The PID controller 24 and the control signal generator 25 are constructed and operate similarly to those of the drive controller 23 according to the first embodiment shown in FIG. 2 and their discussion will therefore be omitted.

(N+0.5) times frequency setting section 28 comprises a frequency divider (demultiplier) circuit such as a programmable counter and hence a frequency division function. The (N+0.5) times frequency setting section 28 frequency-divides (frequency division value $K_T$) the microprocessor reference clock $C_L$ for controlling the entire control unit 15 (see FIG. 1) to make the latter become (integer N+0.5) times the channel frequency interval $\Delta f$ of the channel frequencies assigned for AM radio broadcasts and generates a drive frequency $f_{NB}$, which is (integer N+0.5) times the channel frequency interval $\Delta f$ and expressed by Exp. (3) below, for supplying it to the control signal generator 25.

$$f_{NB} = \Delta f \times (N+0.5) = C_L/K_T \qquad (3)$$

Desirably, the (integer N+0.5) times of the channel frequency interval $\Delta f$ is set in a range of 16 kHz to 30 kHz so as to meet the requirements that the drive frequency $f_{NB}$ be made unhearable to the driver and the PWM-drive switching loss is kept to a minimum.

The conditions in which the embodiment just described is applicable may be determined by Exp. (2) discussed in relation to the first embodiment.

Assuming that the second embodiment is applied to the Japanese radio broadcasts, discussion will be made as to the setting of the frequency division value $K_T$, appearing in Exp. (3), for the (N+0.5) times frequency setting section 28, as well as to the setting of the drive frequency $f_{NB}$, for the PWM-drive control signal $V_{PWM}$.

The drive frequency $f_{NB}$ generated in the (N+0.5) times frequency setting section 28 is desirably set in the range of 16 kHz to 30 kHz. When the channel frequency interval $\Delta f$ is 9 kHz, a value of (integer N+0.5) possible from Exp. (3) is 2.5 times (N+0.5=2.5). Thus, the drive frequency $f_{NB}$ is set to be 22.5 kHz (=9 kHz×2.5).

Accordingly, the (N+0.5) times frequency setting section 28 performs frequency-division (frequency division value $K_T=C_L/22.5$ kHz) to produce the drive frequency $f_{NB}$ of 22.5 kHz.

Figure 6:
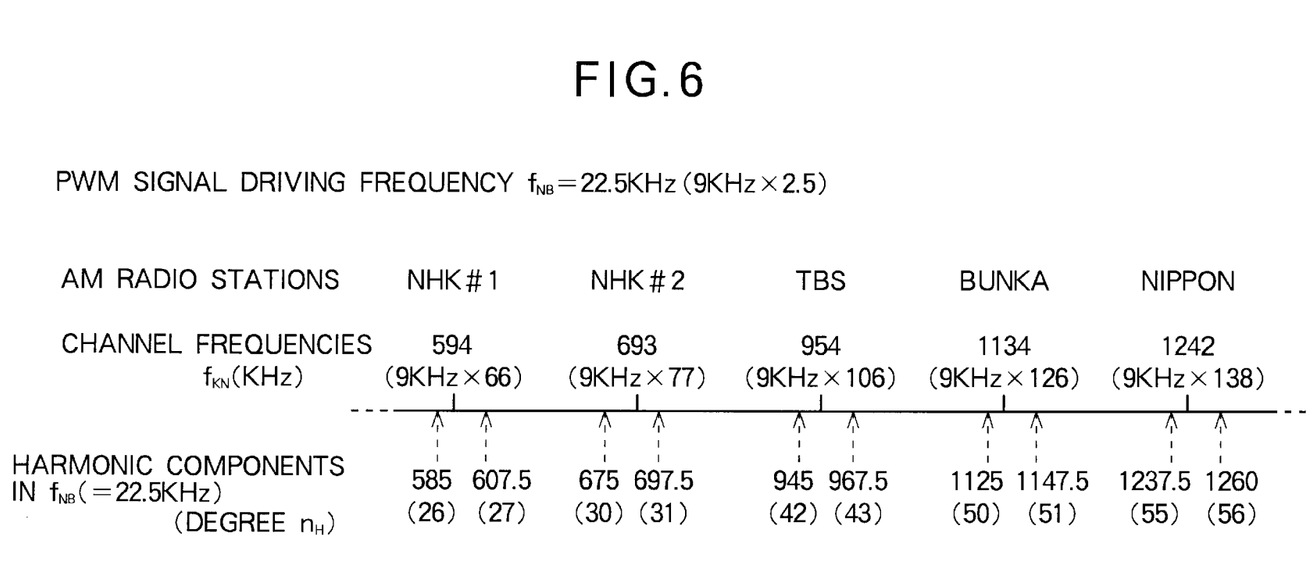
FIG. 6 illustrates a relation between the channel frequency ($f_{KN}$) and a drive frequency ($f_{NB}$) where the drive frequency ($f_{NB}$) of a PWM signal shown in the second embodiment is set to be (integer N+0.5) times the channel frequency interval $\Delta f$ (=9 kHz)

Reference is next made to FIG. 6 which illustrates a relation between the channel frequency ($f_{KN}$) and the drive frequency ($f_{NB}$) when the drive frequency ($f_{NB}$) of a PWM signal shown in the second embodiment is set to be (integer N+0.5) times the channel frequency interval $\Delta f$ (=9 kHz).

As can be readily appreciated from FIG. 6, the harmonic components of the drive frequency ($f_{NB}$=22.5 kHz) do not coincide with the channel frequencies $f_{KN}$ of the radio broadcast stations NHK #1, NHK #2, TBS, Bunka and Nippon.

Concerning NHK #2 (channel frequency $f_{KN}$=693 kHz), the 31st harmonics of the drive frequency ($f_{NB}$=22.5 kHz) is 697.5 kHz which is 4.5 kHz offset from the channel frequency of NHK #2 but coincides with an intermediate value of the channel frequency interval $\Delta f$ (=9 kHz).

Similarly, concerning Nippon (channel frequency $f_{KN}$=1242 kHz), the 55th harmonic components of the drive frequency ($f_{NB}$=22.5 kHz) is 1237.5 kHz which is 4.5 kHz offset from the channel frequency of Nippon but coincides with an intermediate value (=4.5 kHz) of the channel frequency interval $\Delta f$ (=9 kHz).

By making the harmonic components of the drive frequency ($f_{NB}$=22.5 kHz) coincide with the intermediate value of the channel frequency interval $\Delta f$ (=9 kHz) of the channel frequencies of the actual radio broadcast stations or the channel frequencies assigned for radio broadcasts but not in use, the radiation noise associated with the harmonics of the drive frequency ($f_{NB}$=22.5 kHz) can be prevented from being received by a vehicle-mounted radio receiver.

From the channel frequencies $f_{KN}$ of NHK #1, TBS and Bunka, the harmonics of the drive frequency $f_{NB}$ (22.5 kHz) are offset by 9 kHz to become equal to the channel frequency interval $\Delta f$ (=9 kHz) and thus coincide with the channel frequencies assigned for radio broadcasts but not in use.

As explained above, the control unit of the motor driving apparatus 1 in accordance with the second embodiment has the drive controller 27 which for setting the drive frequency $f_{NB}$ of the PWM-drive control signal $V_{PWM}$ to be (integer N+0.5) times the channel frequency interval $\Delta f$ of the channel frequencies assigned for radio broadcasts but not in use. As a result, by generating the radiation noise associated with the harmonic components of the PWM-drive control signal in a magnitude of (integer N+0.5) times the channel frequency interval $\Delta f$, the control unit can make the radiation noise coincide with the intermediate value of the channel frequencies assigned for AM radio broadcasts but not in use, or the channel frequency interval $\Delta f$, and can thus shift the radiation noise away from the channel frequencies of the actual AM radio broad-cast stations, thereby preventing the reception of the radiation noise.

In the control unit described in relation to the first embodiment shown in FIG. 2 and the second embodiment shown in FIG. 3, the accuracy of the reference clock $C_L$ for determining the drive frequencies $f_{NA}$, $f_{NB}$ of the PWM signal also determines the frequency accuracy of the harmonic components of the drive frequencies $f_{NA}$, $f_{NB}$. Accordingly, for making the frequency of the harmonic components of the drive frequencies $f_{NA}$, $f_{NB}$ coincide with the channel frequencies of the AM radio broadcast stations, with the channel frequencies assigned for AM radio broadcasts but not yet in use, or with the intermediate value of the channel frequency interval of the channel frequencies assigned for AM radio broadcasts but not in use, the reference clock $C_L$ is required to be of high precision.

If there occurs an error in the reference clock $C_L$, the deviation between the channel frequencies $f_{KN}$ and frequencies of the harmonic components of the drive frequencies $f_{NA}$, $f_{NB}$ will arise as a beat signal which can be heard as noise over the radio receiver.

Figure 4:
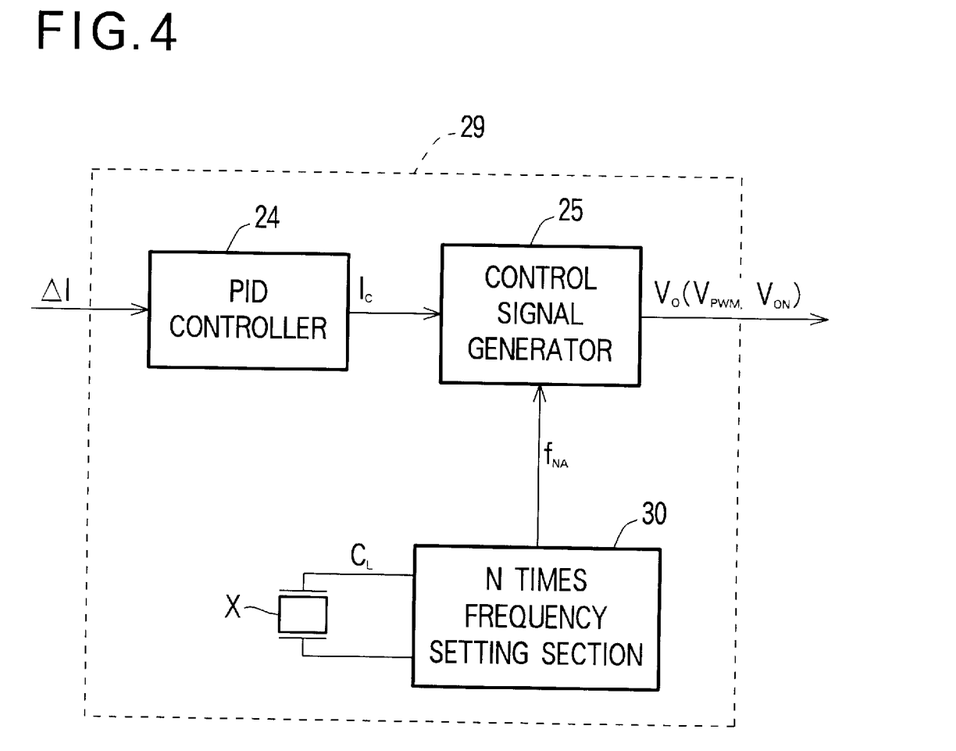
FIG. 4 is a block diagram showing a drive controller of the motor driving apparatus, in accordance with a third embodiment of the present invention.

Discussion will be made next as to the generation of the reference clock $C_L$ wherein the deviation between the channel frequencies $f_{KN}$ and the frequency of the harmonics of the drive frequencies $f_{NA}$, $f_{NB}$ becomes zero, with reference to FIG. 4 showing the drive controller according to a third embodiment of the present invention.

As shown in FIG. 4, the drive controller 29 comprises an N times frequency setting section 30 for generating a drive frequency $f_{NA}$ as described in relation to the first embodiment shown in FIG. 2.

N times frequency setting section 30 determines a drive frequency $f_{NA}$ for the PWM-drive control signal $V_{PWM}$ by frequency-dividing a reference clock $C_L$ generated using an exclusive crystal resonator X in which the least frequency error occurs, and supplies the determined drive frequency $f_{NA}$ to the control signal generator 25 which generates a high precision PWM-drive control signal $V_{PWM}$ and supplies the latter as a motor driving signal $V_O$ to the motor driving circuit 16 (see FIG. 1).

By virtue of the crystal resonator X provided as a source for generating the reference clock $C_L$, it becomes possible to make the frequency of the harmonic components of the drive frequency $f_{NA}$ coincide with the channel frequencies of the AM radio broadcast stations in operation, with the channel frequencies assigned for AM radio broadcasts but not in use, or with the intermediate value of the channel frequency interval of the channel frequencies assigned for AM radio broadcasts but not in use.

Since the drive controller 29 in accordance with the embodiment just described thus establishes the drive frequency $f_{NA}$ of the PWM-drive control signal $V_{PWM}$ on the basis of the crystal resonator X, it can make the deviation between the harmonic components of the drive frequency $f_{NA}$ and the channel frequencies of the AM radio broadcast stations in operation, the channel frequencies assigned for AM radio broadcasts but not in use, or the intermediate value of the channel frequency interval $\Delta f$, to become zero.

As is apparent from the above discussion, the embodiment of FIG. 4 illustrates a case wherein the reference clock $C_L$ of FIG. 2 is formed of the crystal resonator X. It may be readily appreciated by those skilled in the art that the reference clock $C_L$ of FIG. 3 may also comprise such a crystal resonator.

Figure 7:
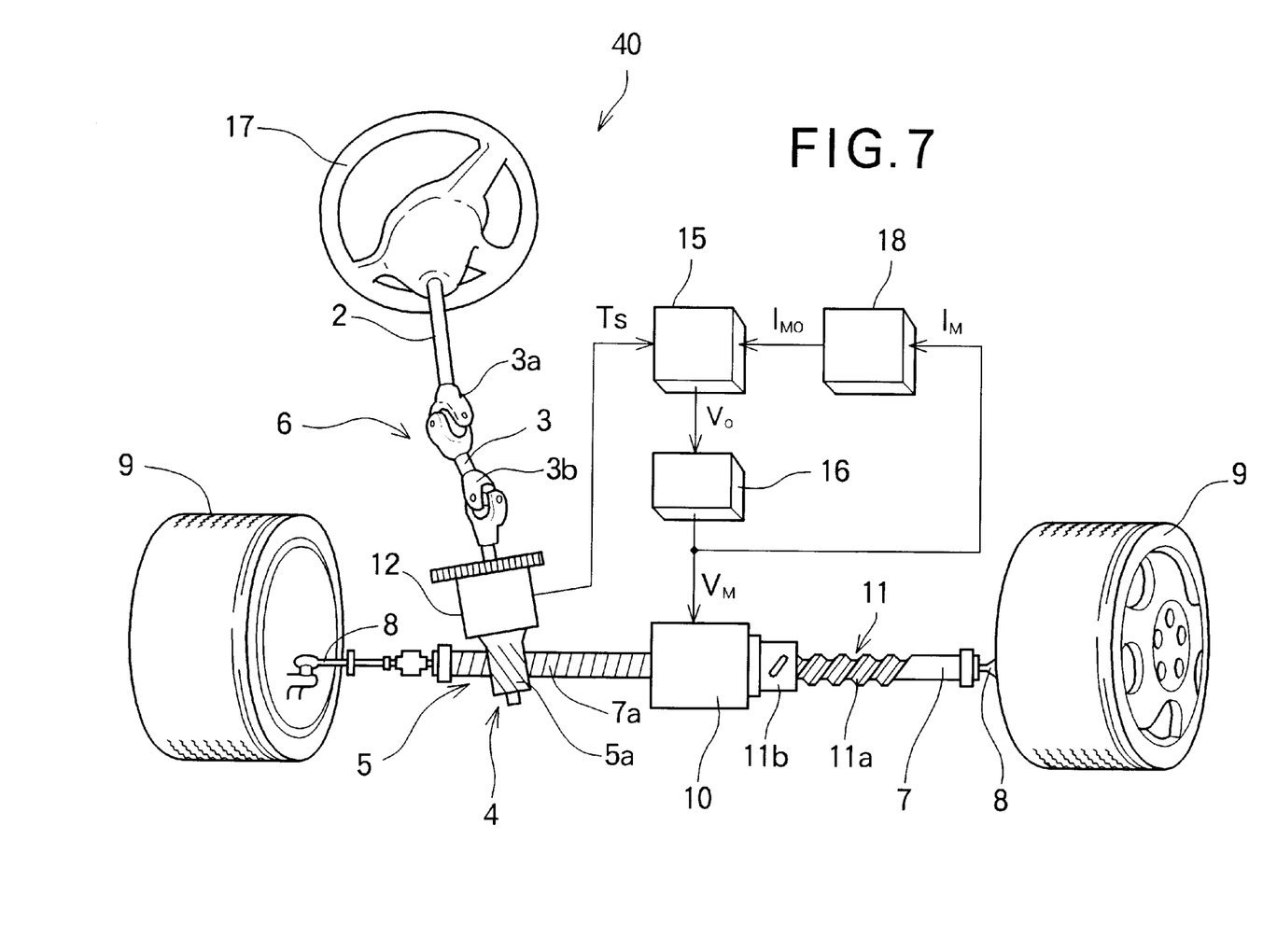
FIG. 7 is a schematic view illustrating an electric power steering apparatus employing the motor driving apparatus according to the present invention.

Reference is now made to FIG. 7 illustrating the general arrangement of an electric power steering apparatus to which the present invention is applied.

As shown in FIG. 7, the electric power steering apparatus 40 includes a manual steering force generating mechanism 6 which is comprised of a steering wheel 17, a steering shaft 2 connected at one end thereof to the steering wheel 17, a connecting shaft 3 connected at one end thereof to an opposite end of the steering shaft 2 via a universal joint 3a and at an opposite end thereof to a pinion 5a of a rack-and-pinion mechanism 5 provided in a steering gearbox 4 via a universal joint 3b.

Rack shaft 7 has rack teeth 7a meshing with the pinion 5a and is thus capable of reciprocal movement. The rack shaft 7 is connected at opposite ends to steered wheels 9, 9 via tie rods 8. Designated by reference numeral 11b is a nut of the ball screw mechanism 11, which is connected to the motor 10.

By turning the steering wheel 17, the steered wheels 9, 9 are turned to thereby determine the orientation of the vehicle.

To reduce a steering force required in the manual steering force generating mechanism 6, an electric motor 10, provided coaxially on the rack shaft 7, supplies a steering assist force to the rack shaft 7 (ball screw shaft 11a) via a ball screw mechanism 11 provided coaxially on the rack shaft 7.

In the steering gearbox 4, there is provided a steering torque sensor 12 for detecting the direction and magnitude of a manual steering torque produced by the driver. The steering torque sensor 12 forms the motor starter 13 shown in FIG. 1. A steering torque signal $T_S$ (motor starting signal $K_S$), which is an analog signal corresponding to the steering torque detected by the steering torque sensor 12, is supplied to the control unit 15.

As explained in relation to FIG. 1, the control unit 15 comprises a microprocessor, a signal generating section and a memory, though not shown, so that it can perform various calculations and processing. For controlling the drive of the motor driving circuit 16, the control unit 15 generates a motor control signal $V_O$ (e.g., combined signal of ON signal $V_{ON}$ and PWM-drive control signal $V_{PWM}$) corresponding to the steering torque signal $T_S$.

Control unit 15 includes the drive controller 23 having a frequence divider such as a programmable counter and hence a frequency dividing function, as described in relation to FIG. 2. The drive controller 23 has the N times frequency setting section 26 which frequency-divides (frequency division value K) the reference clock $C_L$ of the microprocessor for controlling the action of the control unit 15 or the reference clock $C_L$ generated by the high precision crystal resonator X to make the same an integral multiple N of the channel frequency interval $\Delta f$ of the channel frequencies allotted for AM radio broadcasts, and generates the drive frequency $f_{NA}$ which is an integral multiple N of the channel frequency interval $\Delta f$ represented by Exp. (1).

Since the motor driving circuit 16 for driving the motor 10 and the motor current detector 18 which detects a motor current $I_M$ and converts it into a corresponding motor current signal $I_{MO}$ for feed the latter back to the control unit 15 are constructed similarly to those shown in FIG. 1, their description will be omitted.

As shown in FIG. 7, the vehicular motor driving apparatus comprises the control unit 15, motor driving circuit 16 and motor current detector 18.

By thus applying the inventive vehicular motor driving apparatus to an electric power steering apparatus 40, it becomes possible to prevent noise associated with the PWM-drive frequency for PWM-driving the motor from being generated in a car radio set.

Although FIG. 7 shows application of the inventive vehicular motor driving apparatus to an electric power steering apparatus, the present invention is not limited to such an application and may also be applied a rear wheel steering apparatus for four-wheel steering, an automatic steering apparatus and a power window apparatus.

Obviously, various minor changes and modifications of the present invention are possible in the light of the above teaching. It is therefore to be understood that within the scope of the appended claims, the present invention may be practiced otherwise than as specifically described.

What is claimed is:

1. A vehicular motor driving apparatus for driving an electric motor mounted on a vehicle carrying a radio receiver, comprising:

a motor driving circuit for driving said motor; and a control-unit having a drive controller which, for generating a PWM-drive control signal for controlling the PWM-drive of said motor driving circuit on the basis of a motor starting signal, sets a drive frequency of said PWM-drive control signal to be an integral multiple of a channel frequency interval of channel frequencies allotted for AM radio broadcasts.

2. A vehicular motor driving apparatus according to claim 1, wherein said drive controller frequency-divides a reference clock generated by a crystal resonator to set said drive frequency of said PWM-drive control signal to be an integral multiple of said channel frequency interval.

3. A vehicular motor driving apparatus for driving an electric motor mounted on a vehicle carrying a radio receiver, comprising:

a motor driving circuit for driving said motor; and a control unit having a drive controller which, for generating a PWM-drive control signal for controlling the PWM-drive of said motor driving circuit on the basis of a motor starting signal, sets a drive frequency of said PWM-drive control signal to be (integer+0.5) times a channel frequency interval of channel frequencies allotted for AM radio broadcasts.

4. A vehicular motor driving apparatus according to claim 3, wherein said drive controller frequency-divides a reference clock generated by a crystal resonator to set said drive frequency of said PWM-drive control signal to be (integer+ 0.5) times said channel frequency interval.

* * * * *